(12) United States Patent
Guttillo

(10) Patent No.: US 8,156,606 B2
(45) Date of Patent: Apr. 17, 2012

(54) WIPER BLADE

(76) Inventor: Paul Guttillo, Chicago, IL (US)

( * ) Notice: Subject to any disclaimer, the term of this patent is extended or adjusted under 35 U.S.C. 154(b) by 0 days.

(21) Appl. No.: 12/884,366

(22) Filed: Sep. 17, 2010

(65) Prior Publication Data

US 2011/0072609 A1    Mar. 31, 2011

Related U.S. Application Data

(60) Provisional application No. 61/247,159, filed on Sep. 30, 2009.

(51) Int. Cl.
*B60S 1/38* (2006.01)
*B60S 1/28* (2006.01)

(52) U.S. Cl. ............ 15/250.48; 15/250.41; 15/245

(58) Field of Classification Search .......... 15/250.48, 15/245, 245.1, 250.4, 250.41, 250.361; D32/41
See application file for complete search history.

(56) References Cited

U.S. PATENT DOCUMENTS

| | | | | |
|---|---|---|---|---|
| 1,375,682 A | * | 4/1921 | Dennis | 15/245 |
| 1,753,651 A | * | 4/1930 | Gillet | 15/250.41 |
| 2,141,023 A | * | 12/1938 | Ryan | 15/250.03 |
| 3,021,548 A | * | 2/1962 | Stoller | 15/250.48 |
| 3,092,866 A | * | 6/1963 | Jennings et al. | 15/250.48 |
| 3,122,771 A | * | 3/1964 | Dale | 15/250.48 |
| 4,030,159 A | * | 6/1977 | Centoducati | 15/250.48 |
| 5,107,563 A | * | 4/1992 | Zimmerman et al. | 15/250.48 |
| 2009/0025174 A1 | * | 1/2009 | Braun et al. | 15/250.48 |

FOREIGN PATENT DOCUMENTS

FR    2886251    * 12/2006

OTHER PUBLICATIONS

Machine translation of description portion of French 2886251, published Dec. 2006.*

* cited by examiner

*Primary Examiner* — Gary Graham
(74) *Attorney, Agent, or Firm* — Richards Patent Law P.C.

(57) ABSTRACT

A wiper blade includes a first blade and a second blade surrounding the first blade, such that the first blade is not exposed for use, wherein the removal of the second blade exposes the first blade for use. In another embodiment, a wiper blade includes a body, an inner blade attached to the body, an outer blade bonded to the body or inner blade, a gripping mechanism attached to the outer blade and a removal mechanism located between the inner blade and outer blade, wherein the removal mechanism is attached to the gripping mechanism.

20 Claims, 6 Drawing Sheets

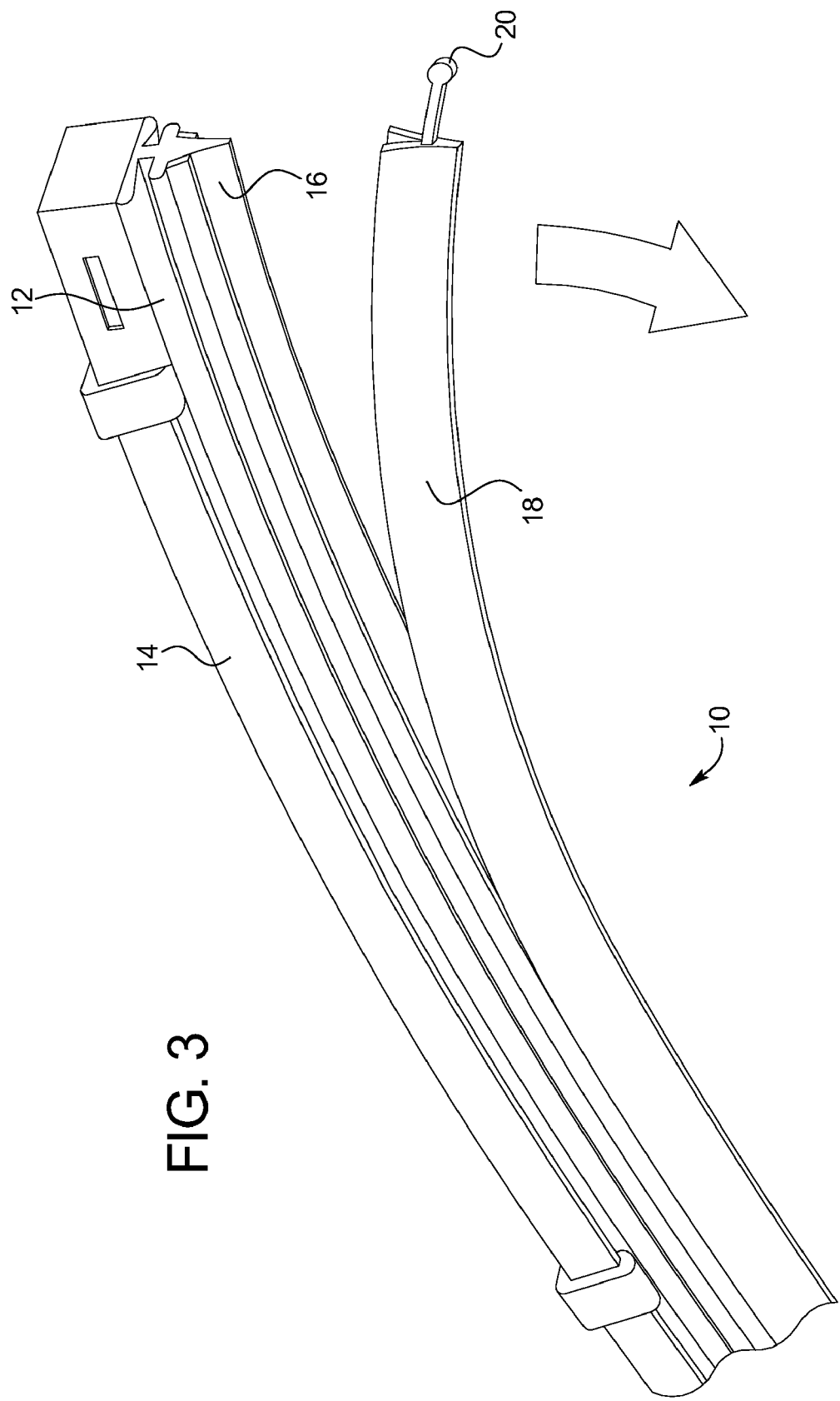

WIPER BLADE

CROSS-REFERENCE TO RELATED APPLICATIONS

This application claims the benefit of U.S. Provisional Application No. 61/247,159, filed on Sep. 30, 2009, the entirety of which is incorporated herein by reference.

BACKGROUND OF THE INVENTION

The present subject matter relates generally to a wiper blade. More specifically, the present invention relates to an automotive wiper blade having a tear off outer blade and a secondary inner blade.

The safe operation of automotives is highly dependant on the operator's ability to see the road. Wiper blades help increase visibility in inclement conditions and, as a result, are an integral component of vehicle safety. Wiper blades have a limited lifespan in which they are able to perform their function effectively. In fact, once a wiper blade has reached the end of its useful lifespan, continued use can often impair the driver's visibility by creating streaks and smearing debris.

One impediment to maintaining effective wiper blades is, while they are not necessarily used each time a vehicle is operated, the wiper blades themselves may degrade during their non-use due to their exposure to the elements to which the vehicle is exposed. As a result, it is not uncommon for an operator of a vehicle to first recognize that the current wiper blades are past their lifespan only after they are needed and cannot perform as required.

It is not common for vehicle operators to keep a spare set of wiper blades in their vehicle for immediate replacement after degraded performance has been observed. Moreover, due to the time required to change a typical wiper blade, a vehicle operator may not want to make the replacement during the inclement weather that brought about the necessity for the wiper blade change. As a preventative measure, many vehicle operators will replace their wiper blades before the wiper blade has reached the end of its lifespan, resulting in less than full usage of the wiper blade.

Accordingly, a need exists for an automotive wiper blade that provides a longer lifespan, an integral spare wiper blade and a quick change mechanism as described herein.

BRIEF SUMMARY OF THE INVENTION

The wiper blade disclosed herein includes: a body that attaches to a backing; an outer blade; an inner blade; and a tab; wherein the outer blade surrounds and protects the inner blade until a user removes the outer blade by applying force to the tab, exposing the inner blade for use. Accordingly, the wiper blade disclosed herein has an extended lifespan over traditional wiper blades and a user can quickly and easily transition from using the outer blade to the inner blade when desired.

It is contemplated that in another embodiment of the wiper blade, the tab is connected to a wire running lengthwise along the interface between the inner blade and outer blade, such that the separation of the outer blade from the inner blade is assisted by a user pulling the tab.

It is further contemplated that in another embodiment of the wiper blade, the number of blades may be increased such that there is an inner blade, an outer blade and one or more intermediate blades, each of which may be exposed by the removal of an adjacent blade.

An advantage of the wiper blade is a longer lifespan when compared to traditional wiper blades.

Another advantage of the wiper blade is an integral backup wiper blade.

A further advantage of the wiper blade is a quick change mechanism for switching from the primary to the inner blade.

Yet another advantage of the wiper blade is increased vehicle operation visibility and safety.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 3 is a perspective view of the wiper blade shown in FIG. 1, wherein the outer blade is being removed to expose the inner blade beneath.

DETAILED DESCRIPTION OF THE INVENTION

Figure 1:
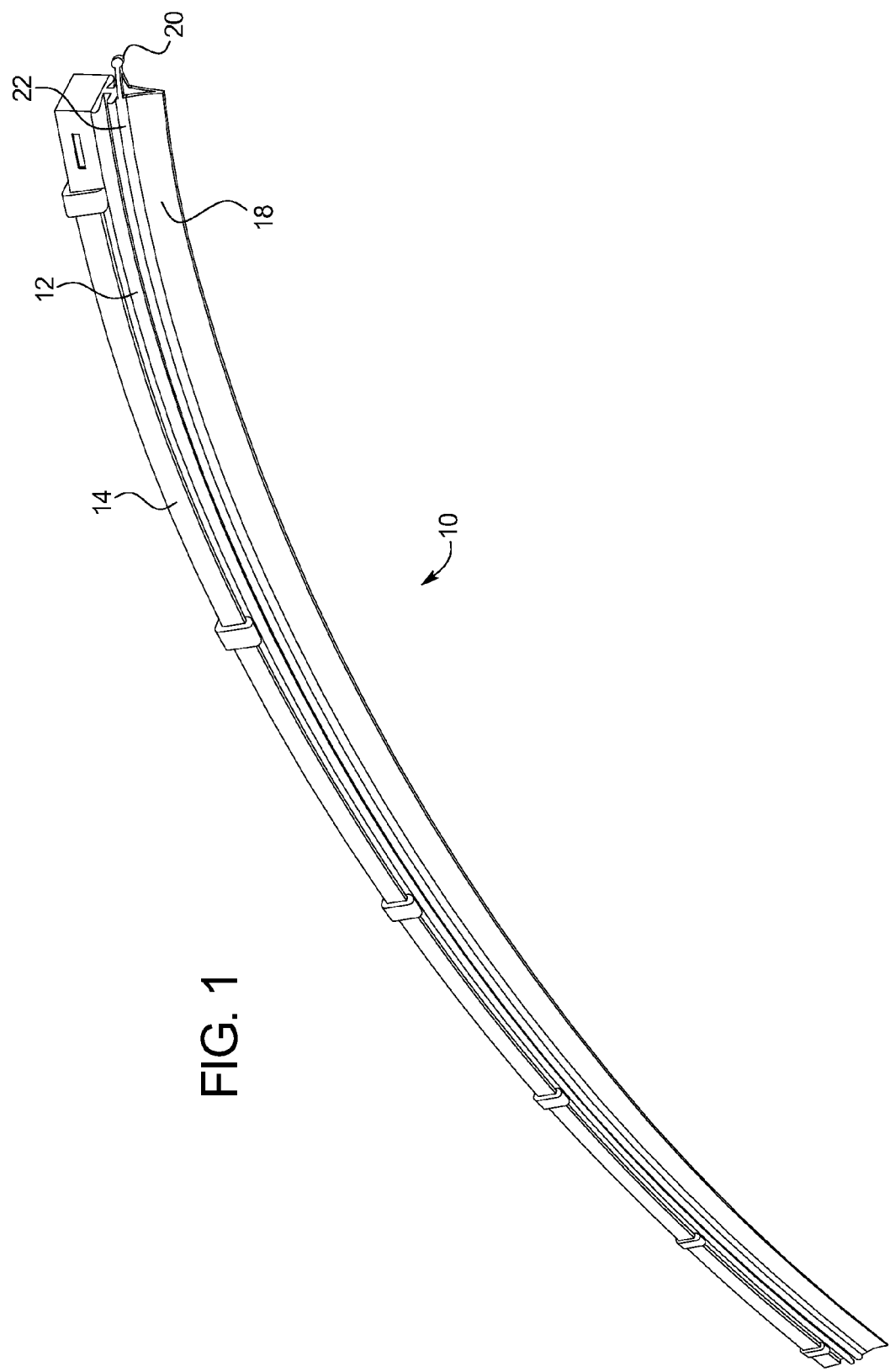
FIG. 1 is a perspective view of a wiper blade.
Figure 2A:
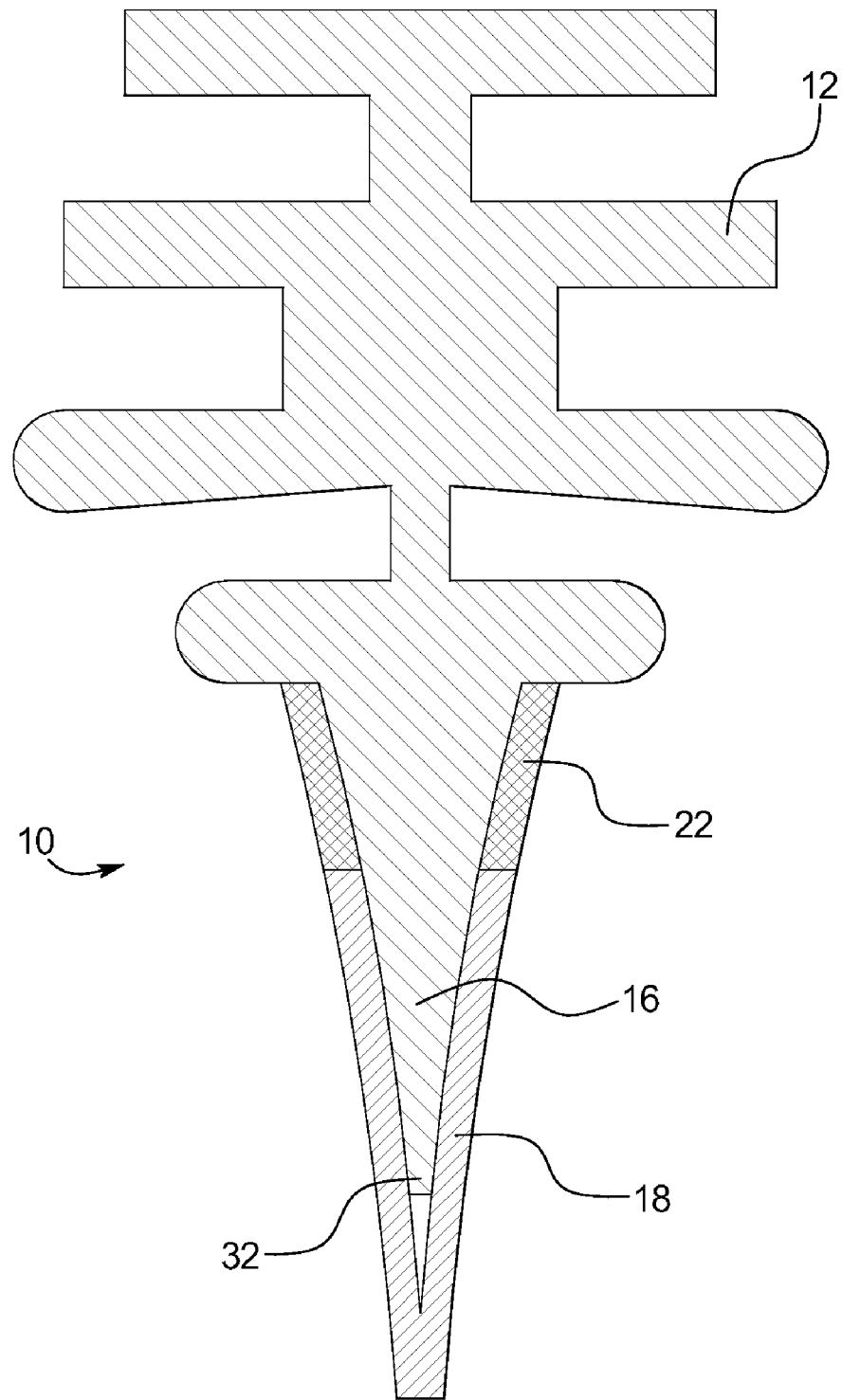
FIG. 2A is a cross-sectional view of the wiper blade shown in FIG. 1.
Figure 4:
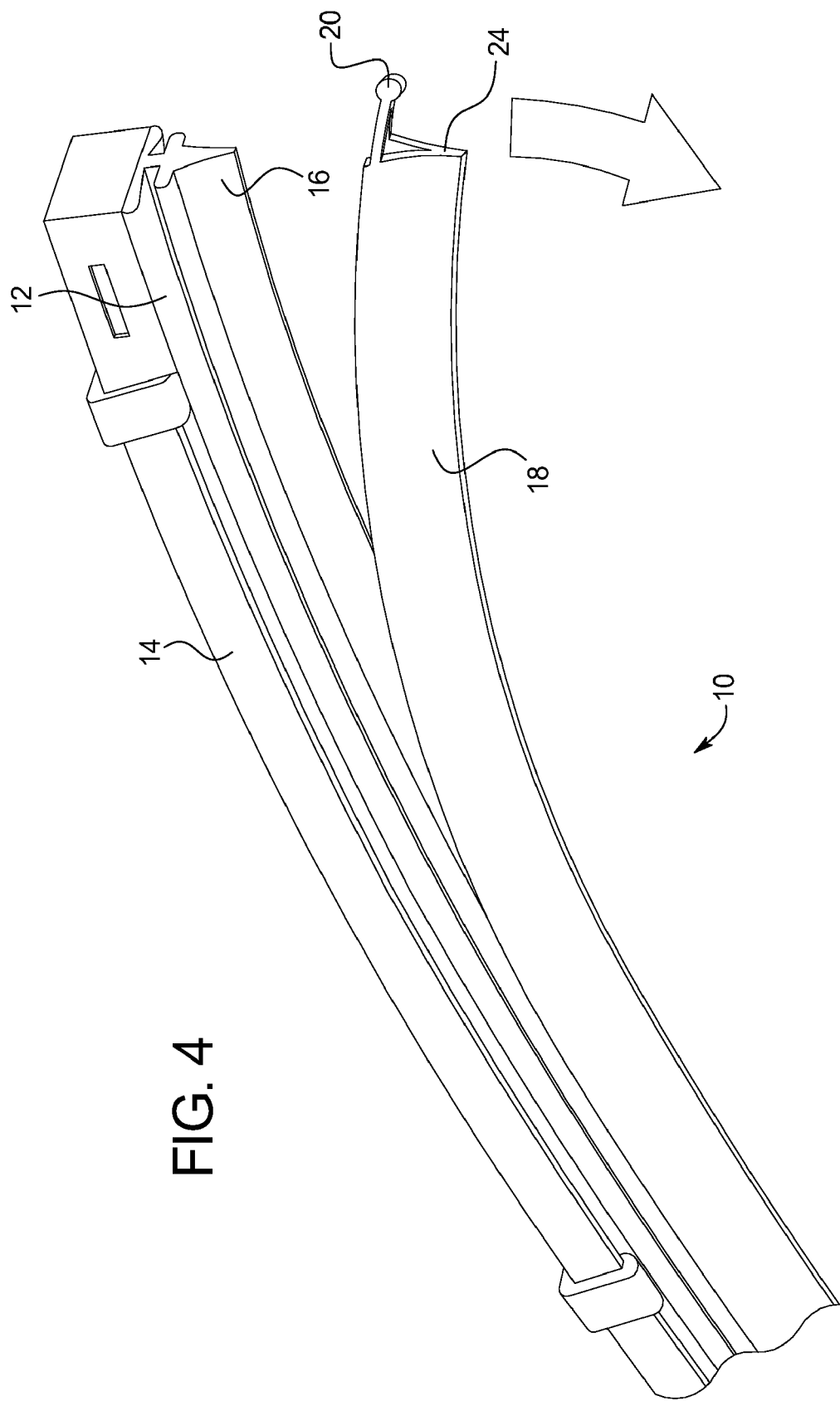
FIG. 4 is a perspective view of another embodiment of a wiper blade, wherein the outer blade is being removed to expose the inner blade beneath.

The wiper blade 10 shown in FIG. 1 includes a body 12 for mating to a backing 14 and an outer blade 18 surrounding an enclosed inner blade 16 (shown in FIGS. 2-4). The outer blade 18 is removeably secured to the wiper blade 10 such that the outer blade 18 can be removed and disposed to uncover the inner blade 16 for use. As shown, a tab 20 provides a convenient location for a user to apply the force required to remove the outer blade 18 from the wiper blade 10. The process for removing the outer blade 18, as described herein, is fast and easy, enabling the user to quickly change to the inner blade 16 when desired. As a result, the outer blade 18 may be used until the end of its lifespan before being discarded.

As shown in FIGS. 1, 2A, 2B and 5, prior to removal, the outer blade 18, directly or indirectly, surrounds and encloses the inner blade 16. Thus, the inner blade 16 is not exposed to the elements and is protected from degradation by the outer blade 18. Accordingly, in use, the outer blade 18 may engage the windshield of the vehicle to which it is associated to perform the function of a conventional wiper blade. Then, when the user determines the utility of the outer blade 18 has expired, the user may apply the required force to the tab 20 to remove the outer blade 18, exposing the inner blade 16 for use.

The backing 14 shown in the Figs. is a standard automotive wiper blade backing enabling the wiper blade 10 disclosed herein to be a replacement for standard automotive wiper blades. It is contemplated that the wiper blade 10 disclosed herein can be paired with a backing 14 of any design.

In the examples shown, the body 12, the inner blade 16, the outer blade 18 and the interface may each be made from rubber. However it is understood that other materials may be used to achieve the advantages taught herein. As shown in FIGS. 1, 2A, 2B and 3, the outer blade 18 may be bonded to the interface 22 for removal therefrom. As shown in FIG. 4, the outer blade 18 may be bonded to the inner blade 16 or body 12. The bonding between elements may utilize, for example, a vulcanization process, such that the outer blade 18 is vulcanized along a connected surface to the element from which it is to be removed. However, it is understood that there are a number of other materials and/or bonding methods that may be used to implement the wiper blade 10 of the present subject matter, providing a bond between the outer blade 18 and the body 12 that is capable of withstanding use, while being weak enough to be smoothly broken by the force applied by a user. Accordingly, when force is applied to the tab 20, the outer blade 18 may be removed from the wiper blade 10.

As shown in FIG. 1, the outer blade 18 is bonded to the interface 22 and the tab 20 is integral with the interface 22. In this embodiment, the interface 22 may be releasably bonded to the body 12 or the inner blade 16 and the outer blade 18 may be releasably bonded to the interface 22. Accordingly, a user may apply force to the tab 20 to tear the interface 22 from the body 12 or inner blade 16, and the outer blade 18 may or may not be removed from the interface 22, exposing the inner blade 16.

As shown in FIG. 3, the outer blade 18 is bonded to the interface 22 and the tab 20 is integral with the outer blade 18. Accordingly, the outer blade 18 may be torn cleanly from the interface 22, exposing the inner blade 16.

As shown in FIG. 4, the outer blade 18 is bonded to the inner blade 16 and the tab 20 is integral with the outer blade 18. Accordingly, the outer blade 18 may be torn cleanly from the inner blade 16, exposing the functional edge 32 of the inner blade 16

In each of these examples, the inner blade 16 maintains its properties as an effective wiper since its functional edge 32 has not been affected by the removal of the outer blade 18

FIG. 1 illustrates how the tab 20 may be attached to the interface 22. FIGS. 3 and 4 illustrate how the tab 20 may be attached to the outer blade 18. As shown in FIG. 3, the tab 20 may be attached to a single portion of the outer blade 18 or, as shown in FIG. 4, the tab 20 may attach to the outer blade 18 on each side of the blade edge 24. Accordingly, the force applied to the tab 20 to remove the outer blade 18 from the wiper blade 10 may be directed into the interface 22 or the outer blade 18 and the placement of the tab 20 may helps focus the removal force directly into the portion of the wiper blade 10 in which it will be most effective for removing the outer blade 18. It is understood that the attachment of the tab 20 to the outer blade 18 or interface 22 needs to be stronger than the bonds to be broken.

FIGS. 3 and 4 illustrate the process of removing the outer blade 18 from wiper blade 10. When adequate force is applied to the tab 20 to break the bond securing the outer blade 18 to the wiper blade 10, the outer blade 18 may be peeled off of the wiper blade 10 to be discarded. It is understood that the tab 20 shown is just one example of a removal mechanism that may be employed. For example, the singular tab 20 may be replaced by two or more tabs 20. Alternatively, the tab 20 may be repositioned along the wiper blade 10. The tab 20 may also be of various sizes and shapes.

Figure 2B:
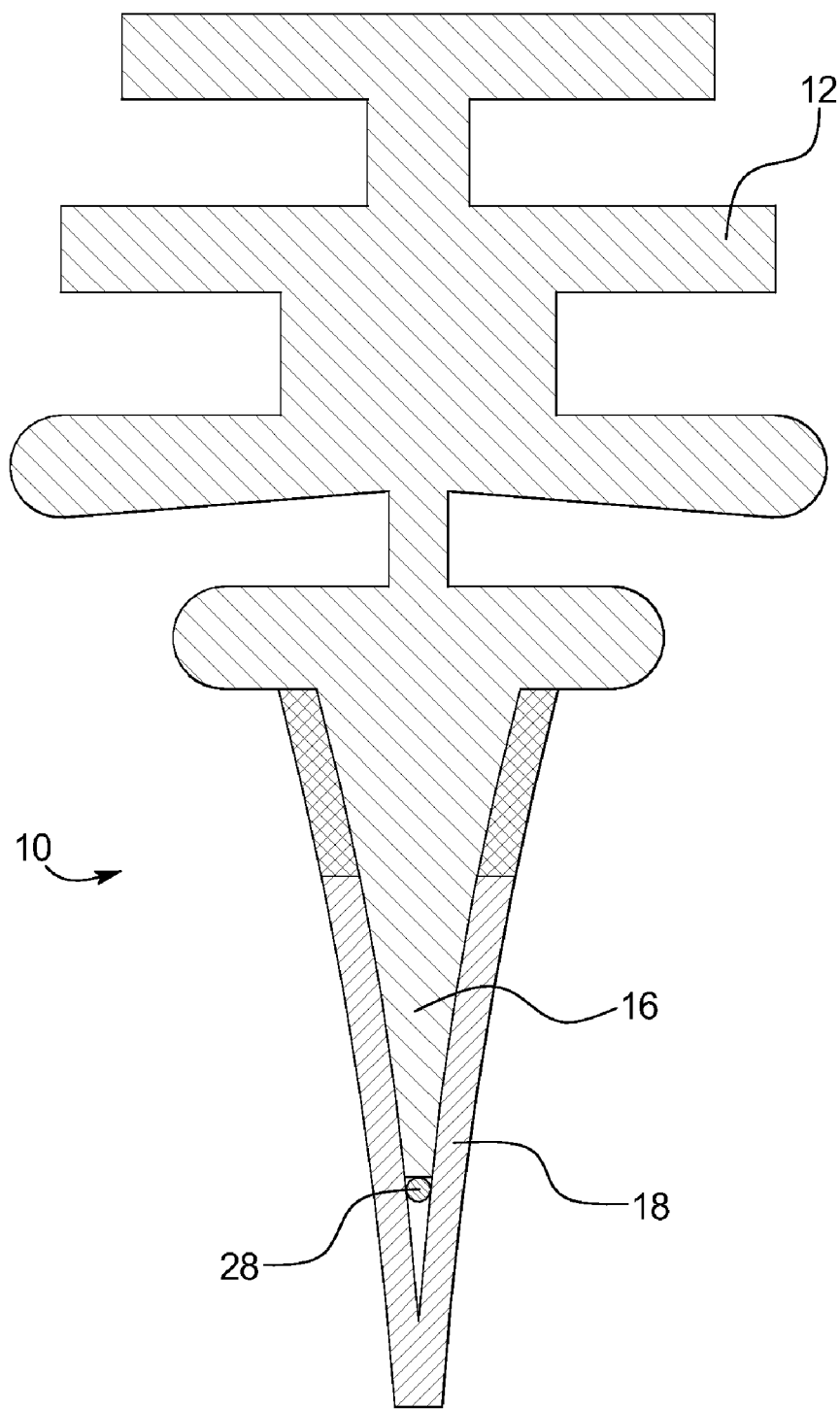
FIG. 2B is a cross-sectional view of a wiper blade including a wire between the inner and outer blades.

In addition, as shown in FIG. 2B, the tab 20 may be optionally connected to a wire 28 running lengthwise along the wiper blade 10 between the inner blade 16 and the outer blade 18, such that the separation of the outer blade 18 from the inner blade 16 is assisted by a user pulling the tab 20. The wire 28 provides a rigid structural material to which the user may apply greater force than is required to separate the outer blade.

Figure 5:
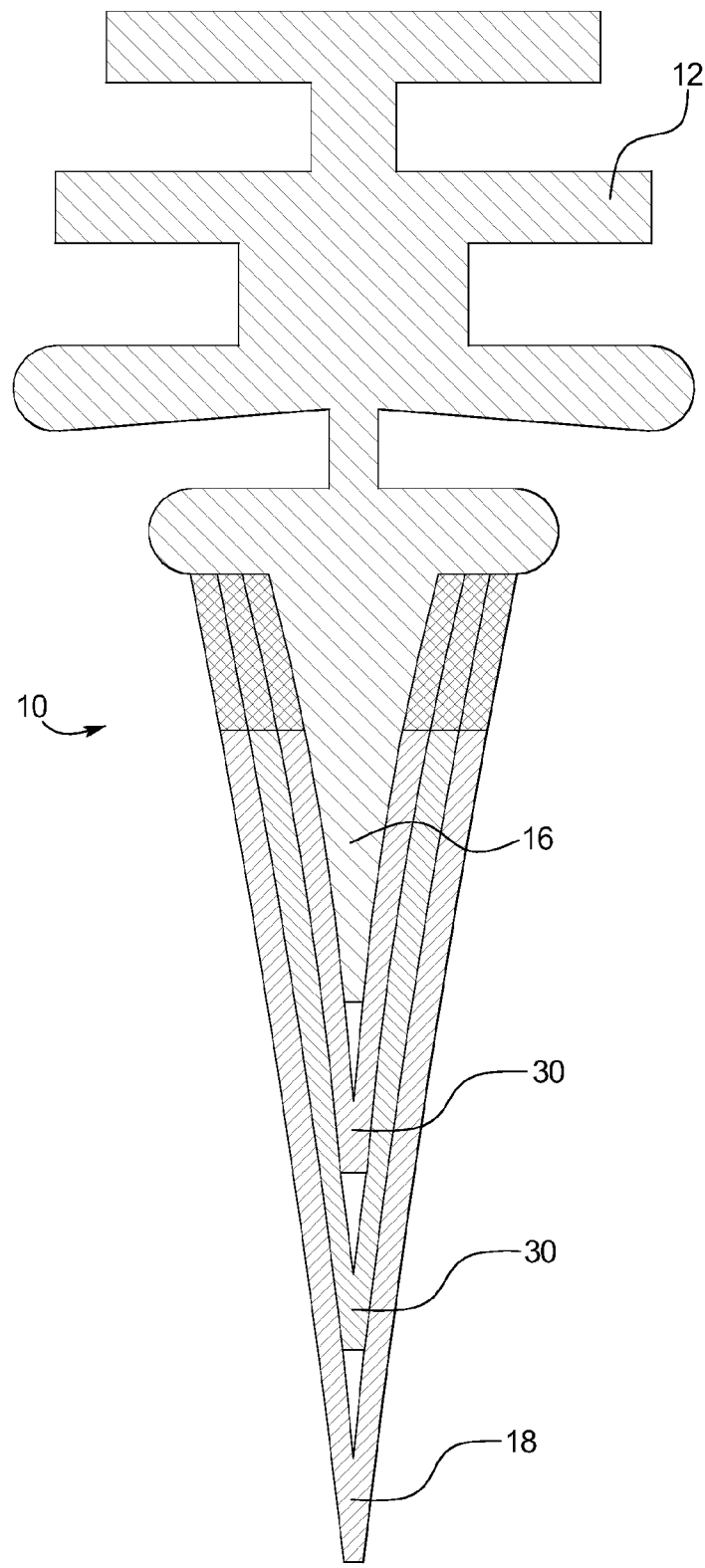
FIG. 5 is a cross-sectional view of another wiper blade including an inner blade, two intermediate blades and an outer blade.

FIG. 5 illustrates another embodiment of the wiper blade 10 in which there is an inner blade 16, an outer blade 18 and two intermediate blades 30, each of which may be exposed by the removal of an adjacent blade. Such an embodiment may include a tab 20 or other gripping mechanism for each blade 16, 18 or 30 and may, or may not, include a wire 28 or other removal mechanism associated with each blade 16, 18 or 30.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A wiper blade comprising:
   a body;
   an inner blade attached to the body;
   an outer blade bonded to the body or inner blade;
   a gripping mechanism attached to the outer blade; and
   a removal mechanism located between the inner blade and outer blade, wherein the removal mechanism is attached to the gripping mechanism and further wherein the body, inner blade and outer blade are made of rubber.

2. The wiper blade of claim 1 wherein the gripping mechanism is a tab.

3. The wiper blade of claim 1 wherein the gripping mechanism is a wire.

4. The wiper blade of claim 1 wherein the removal mechanism is a wire.

5. The wiper blade of claim 1 wherein the outer blade protects the inner blade from exposure to the elements and wherein the removal of the outer blade exposes the inner blade for use.

6. The wiper blade of claim 1 further including an additional blade bonded to the body of the outer bade.

7. The wiper blade of claim 6 wherein the additional blade protects the outer blade from exposure to the elements and wherein the removal of the additional blade exposes the outer blade for use.

8. A wiper blade comprising:
   a body;
   an inner blade attached to the body;
   an outer blade bonded to the body or inner blade;
   a gripping mechanism attached to the outer blade; and
   a removal mechanism located between the inner blade and outer blade, wherein the removal mechanism is attached to the gripping mechanism and further wherein the outer blade is vulcanized to the body.

9. The wiper blade of claim 8 wherein the gripping mechanism is a tab.

10. The wiper blade of claim 8 wherein the gripping mechanism is a wire.

11. The wiper blade of claim 8 wherein the removal mechanism is a wire.

12. The wiper blade of claim 8 wherein the outer blade protects the inner blade from exposure to the elements and wherein the removal of the outer blade exposes the inner blade for use.

13. The wiper blade of claim 8 further including an additional blade bonded to the body of the outer bade.

14. The wiper blade of claim 13 wherein the additional blade protects the outer blade from exposure to the elements and wherein the removal of the additional blade exposes the outer blade for use.

15. A wiper blade comprising:
a body;
an inner blade attached to the body;
an outer blade bonded to the body or inner blade;
a gripping mechanism attached to the outer blade; and
a removal mechanism located between the inner blade and outer blade, wherein the removal mechanism is attached to the gripping mechanism and further wherein the outer blade is vulcanized to the inner blade.

16. The wiper blade of claim 15 wherein the gripping mechanism is a tab.

17. The wiper blade of claim 15 wherein the gripping mechanism is a wire.

18. The wiper blade of claim 15 wherein the removal mechanism is a wire.

19. The wiper blade of claim 15 wherein the outer blade protects the inner blade from exposure to the elements and wherein the removal of the outer blade exposes the inner blade for use.

20. The wiper blade of claim 15 further including an additional blade bonded to the body of the outer bade.

* * * * *